United States Patent Office 3,032,512
Patented May 1, 1962

3,032,512
PLATINIZED ALUMINA CATALYSTS OF CONTROLLED HALOGEN CONTENT
Malden W. Michael and William B. Innes, Stamford, Conn., assignors to American Cyanamid Company, New York, N.Y., a corporation of Maine
No Drawing. Filed Jan. 28, 1959, Ser. No. 789,493
6 Claims. (Cl. 252—441)

This invention relates to methods for controlling the halide content of acid-leached platinized alumina hydrocarbon reforming catalysts and has for its principal object the provision of methods whereby the halide content of such catalysts can be regulated within close limits by commercially feasible production procedures.

It is well known that the catalytic reforming of volatile petroleum hydrocarbons in the presence of hydrogen, which is frequently called hydroforming, is a complex procedure. When petroleum hydrocarbon fractions such as those boiling in the gasoline range, particularly between about 200° and 425° F., are mixed with hydrogen and passed over a platinized alumina catalyst at temperatures of about 600°–1100° F. and pressures of about 50–500 p.s.i. or more their fuel value in an internal combustion engine is materially improved. This is due to a number of reactions which take place simultaneously including an isomerization reaction in which more highly branched-chain paraffins are formed, dehydrocyclization and aromatization reactions and also a hydrocracking reaction.

It has been known for some years that the activity of platinized alumina catalysts for this process, as determined by the standard 200 p.s.i. naphtha reforming test, can be increased by combining additional halogen with the alumina. It is also known, however, that the added halogen increases the extent of hydrocracking, and therefore too much halogen in the catalyst is frequently undesirable.

Our present invention is directed to a method of producing platinized alumina catalysts which have increased activity for hydroforming but in which the halogen content can be controlled at any desired level. The enhanced activity of our catalysts is obtained by leaching them with a non-halogen acid, which is preferably nitric acid, and the controlled halogen content may be obtained by the conjoint use of a halogen acid such as hydrochloric or hydrofluoric acid or of an aluminum salt thereof such as aluminum chloride or fluoride.

In preparing catalysts in accordance with the process of our invention a suitable active alumina is first formed into pieces of suitable size and shape such as cylindrical pellets, spherical beads and the like. Although alumina from any source may be employed, we prefer to use either a sol-type alumina, prepared by gelling and drying an aqueous alumina sol, or precipitated alumina obtained by neutralizing an aqueous alkali metal aluminate or aluminum salt solution and washing and drying the resulting aluminum hydroxide. Alumina from these sources is preferred because it produces gamma-alumina when calcined at temperatures within the range of 1000°–1500° F., but it will be understood that the principles of our invention may be applied to alumina of other types.

The shaped alumina pieces, after a first calcination at 1000°–1500° F., are leached with an aqueous acid to increase the activity of the finished catalyst and are then impregnated with an aqueous chloroplatinic acid solution. As is indicated above, one important feature of our invention resides in the use of aqueous nitric acid as the leaching agent, with or without admixture with hydrochloric acid or other halogen acid to impart a controlled content of combined halogen to the leached alumina. We have found that when active alumina is leached with a strong mineral acid such as nitric acid or a mixture of nitric and hydrochloric acids the anion of the acid is immediately adsorbed on the alumina in a quantity of about 0.1 equivalent per mol of $Al_2O_3$. This proportion of adsorbed acid stays practically constant while the remainder of the leaching acid converts the $Al_2O_3$ to soluble aluminum salts which are subsequently removed by washing. There is, therefore, a direct competition for active sites on the alumina by the anions present, and by adsorbing nitrate ions on these sites the combination of halide ions such as chloride or fluoride ions therewith can be correspondingly reduced.

When active alumina pieces are leached at 30°–50° C. using 200 cc. of aqueous leaching acid solution for each 100 grams of alumina and 1 equivalent of a strong inorganic acid for each mol of $Al_2O_3$, about 60% or 0.6 equivalent of acid per mol of $Al_2O_3$ is converted into the aluminum salt of the acid in one hour and can be removed by subsequent washing. About 0.1 equivalent of the acid is adsorbed on the alumina, as described above. The remaining 0.3 equivalent of acid is unchanged and is removed when the leached alumina is washed with water. If hydrochloric or hydrofluoric acid is used as the leaching agent the alumina therefore retains a substantial content of chloride or fluoride ions, whereas if a non-halogen acid is used the acid-adsorbing sites in the alumina are occupied thereby and do not readily combine with halogen. Nitric acid presents the great advantage over other non-halogen inorganic acids, such as sulfuric acid or phosphoric acid for example, that its aluminum salt decomposes to aluminum oxide upon subsequent heating without leaving a solid residue in the catalyst.

Most of the improvement in activity that results from acid leaching is obtained when the first 2–3% of $Al_2O_3$ has been removed from the catalyst pellets but further leaching continues to remove alumina and thus reduces the density of the catalyst. For most purposes the extent of leaching should be such that from about 2% to about 15% of alumina is removed; i.e., the leached alumina pieces undergo this loss in weight. Although the reasons for the improvement in activity obtained by acid leaching are not fully understood, we believe that the action of the acid improves access to the interior of the alumina pieces, thus permitting more uniform impregnation with platinum and halogen and also improving diffusion of reagents into and through the catalyst. Changes in the number or acidity of sites in the alumina might also be expected to account for part of the improvement, as would the elimination of adsorbed basic impurities which might function as catalyst poisons.

After the alumina has been leached to the extent indicated it is washed with water to remove aluminum salts and excess acid. Completion of the washing can be conveniently followed by measuring the pH of the wash water after it has contacted the leached alumina. Ordinarily the washing is complete when the pH of the wash water is 4.6 or slightly higher. The alumina is then oven dried at about 200°–300° F. and may be calcined at 1000°–1400° F. or higher for about one hour. The residual halogen content of alumina leached with a halogen acid can be controlled to some extent by regulating the calcination temperature within this range since higher temperatures tend to reduce the content of residual chlorine or fluorine, but the hydrochloric or hydrofluoric acid is evolved only at high temperatures within the calcination range and therefore creates a serious corrosion problem. When the halogen acid is mixed with nitric acid, however, the hydrogen halide is given off along with oxides of nitrogen at a much lower temperature; in fact, much of it is removed when the leached and washed alumina is oven-dried at 250°–300° F. or slightly higher.

After oven drying or drying and calcination the alumina is impregnated with platinum by soaking in or spraying with an aqueous solution of chloroplatinic acid ($H_2PtCl_6$) which preferably also contains a penetrant or penetration aid to assist thorough impregnation of the alumina by the platinum. The use of such penetrants is known in the art; such acids as nitric and hydrochloric and acidic salts such as aluminum nitrate and aluminum chloride are preferred. They are used in quantities such as to reduce the pH of the chloroplatinic acid solution to about 2.5–2, care being taken that the amount of acid present is not such as to react with any of the alumina.

We have found that the quantity of chlorine or other halogen atom that will combine with the alumina from the chloroplatinic acid solution in this step can be reduced by the presence of an excess of nitric acid or aluminum nitrate over and above the quantity usually employed as a penetration aid. The presence of increased nitrate results in decreased chlorine or fluorine retention because of competition between the halogen ion and the nitrate ion for surface adsorption sites. Fairly large amounts of nitrate ion are required to effect large reductions in halide retention but if the second calcination is eliminated the adsorbed nitrate ions from a nitric acid leaching will effect a final halogen control at the desired level. Typical chloroplatinic acid impregnation procedures using various penetrants are described in the following examples.

The platinized alumina hydroforming catalysts in present commercial use normally contain about 0.2% to 1% of platinum and 0.2% to 1.5–2% of halogen, the balance being substantially all alumina. Chloroplatinic acid introduces about the same quantity of platinum as chlorine into the catalyst; i.e., a catalyst containing 0.3% of platinum will also contain 0.3% of chlorine originating in the chloroplatinic acid. Additional halogen is usually incorporated either by precipitating the alumina from aluminum chloride or by introducing a halogen salt along with the platinum. Acid leaching of the alumina, as described above, increases the activity of such catalysts by about 30%, and therefore their halogen content can be reduced to avoid excessive hydrocracking without reducing the overall activity or effectiveness of the catalyst. If desired, however, leached catalysts of relatively high halogen content can also be prepared by the process of our invention, and such catalysts exhibit increased initial activities of up to 30% as compared with unleached platinized alumina catalysts of the same halogen content.

The invention will be further described and illustrated by the following specific examples to which, however, it is not limited.

EXAMPLE 1

An alumina sol, prepared by digesting amalgamated aluminum with water containing acetic acid as described in U.S. Patent No. 2,274,634, was gelled with ammonium hydroxide, dried and calcined and the resulting gamma-alumina was compressed into ⅛-inch pellets having a density of about 0.8 gram per cc. These were calcined for about one hour at 1100°–1500° F. as indicated under "First Calcination" in Table I below.

The following leaching procedure was used. A batch of pellets weighing 200 grams was placed in a beaker and 600 cc. of aqueous leaching solution containing the acid or mixture of acids in the molar quantities per mol of $Al_2O_3$ indicated below was added. The mixture was agitated at 30°–40° C. for one hour after which the pellets were transferred to a 2-inch column and washed with pure water until the pH of the effluent was 4.6. They were then dried overnight in an oven at 250° F. and calcined one hour at the temperature indicated under "Second Calcination."

The pellets were platinized by spraying them with a volume of aqueous chloroplatinic acid solution equal to their pore volumes (0.55–0.6 cc. per gram) which contained the indicated quantities of platinum and penetrant, thus obtaining a 90–100% complete penetration of the pellets by the platinum solution. They were then dried in an oven and calcined by heating in a muffle to 1100° F. during 3 hours and holding at this temperature for one hour.

*Table 1*

| Catalyst No. | Calcination, °F. | | Leaching | | Percent $Al_2O_3$ Removed | Percent Cl in $Al_2O_3$* | Impregnant | | Percent in Catalyst | |
|---|---|---|---|---|---|---|---|---|---|---|
| | First | Second | Acid | Mols per Mol $Al_2O_3$ | | | Type | Mols per Mol Pt | Pt | Cl |
| 240 | 1,500 | 1,400 | HCl | 1.0 | 10 | 1.18 | None | | 0.3 | 0.8 |
| 331 | 1,400 | 1,100 | HCl | 1.0 | 9 | 1.25 | None | | 0.6 | 0.81 |
| 263 | 1,100 | 1,100 | $HNO_3$ | 1.0 | 12 | 0 | $Al(NO_3)_3$ / $AlCl_3$ | 1 / 0.1 | 0.6 | 0.68 |
| 375 | 1,400 | 1,100 | $HNO_3$ | 1.0 | 8 | 0 | $Al(NO_3)_3$ | 3.6 | 0.6 | 0.60 |
| 216 | 1,400 | 1,100 | $HNO_3$ | 1.0 | 8 | 0 | $HNO_3$ | 33 | 0.3 | 0.27 |
| 371 | 1,400 | 1,100 | HCl / $HNO_3$ | 0.25 / 0.75 | 9 | 0.39 | $HNO_3$ | 7 | 0.6 | 0.69 |
| 381 | 1,400 | None | HCl / $HNO_3$ | 0.25 / 0.75 | 2 | 0.39 + 2% $NO_2$ | $HNO_3$ | 7 | 0.6 | 0.58 |

*After second calcination.

EXAMPLE 2

Precipitated alumina was prepared by running streams of aqueous sodium aluminate and aluminum sulfate solutions simultaneously into an agitated reaction tank, filtering and washing free from impurities as described in Ashley U.S. Patent No. 2,657,115. It was dehydrated, ground and pelleted and the pellets were leached and impregnated with aqueous chloroplatinic acid solution in which the indicated impregnants were dissolved.

Table II

| Catalyst No. | Calcination, °F. | | Leaching | | Percent Al₂O₃ Removed | Percent Cl in Al₂O₃ | Impregnant | | Percent in Catalyst | |
|---|---|---|---|---|---|---|---|---|---|---|
| | First | Second | Acid | Mols per Mol Al₂O₃ | | | Type | Mols per Mol Pt | Pt | Cl |
| 326 | 1,100 | 1,100 | HNO₃ | 0.5 | 9 | 0 | {AlCl₃ / Al(NO₃)₃} | {0.6 / 1.8} | 0.6 | 0.6 |
| 333 | 1,400 | 1,100 | HNO₃ | 0.6 | 10 | 0 | ---do--- | ---do--- | 0.6 | 0.73 |
| 313 | 1,100 | 1,100 | HNO₃ | 1.0 | 14 | 0 | ---do--- | ---do--- | 0.6 | 0.8 |
| 390 | 1,100 | 1,100 | HNO₃ | 1.0 | 8 | 0 | ---do--- | ---do--- | 0.8 | 0.89 |
| 232 | 1,400 | 1,100 | HCl | 1.0 | 10 | 0.35 | {AlCl₃ / HNO₃} | {3 / 25} | 0.3 | 0.41 |
| 235 | 1,400 | 1,100 | HNO₃ | 1.0 | 10 | 0 | AlCl₃ | 11 | 0.3 | 0.63 |

Preparation No. 232 illustrates the use of an excess of nitric acid in the platinum solution to reduce the halogen content of the finished catalyst while No. 235 illustrates the use of excess aluminum chloride to control the halogen content of alumina that has been leached with nitric acid.

What we claim is:

1. A method of producing a platinized alumina catalyst which comprises leaching pieces of active alumina with a mixture of nitric acid and hydrochloric acid by contacting them with a mixture of said acids sufficiently strong to react with alumina until from about 2% to 15% of the alumina is solubilized, washing the leached pieces with water and then impregnating them with an aqueous solution of chloroplatinic acid.

2. A method of producing a platinized alumina catalyst which comprises leaching pieces of active alumina with nitric acid until from about 2% to about 15% of the alumina is solubilized, washing the leached pieces with water while leaving about 0.1 mol of nitrate per mol of Al₂O₃ therein and drying them at about 200°–300° F., impregnating them with an aqueous chloroplatinic acid solution containing about 0.2% to about 1% of platinum on the weight of the alumina, and drying and calcining the impregnated pellets so obtained.

3. A method of producing a platinized alumina catalyst which comprises leaching pieces of active alumina with nitric acid until from about 2% to about 15% of the alumina is solubilized, washing the leached pieces with water and drying them at about 200°–300° F. and thereby leaving adsorbed nitrate in the dried pieces, impregnating the pieces so obtained with an aqueous chloroplatinic acid solution containing about 0.2% to 1% of platinum on the weight of the alumina and also containing a penetrant selected from the group consisting of hydrochloric acid and aluminum chloride, and drying and calcining the impregnated pellets so obtained.

4. In the production of halogen-containing platinized alumina catalysts the method of controlling the halogen content thereof which comprises leaching pieces of active alumina by contacting them with a nitric acid-containing leaching solution sufficiently strong to react with alumina until from about 2% to about 15% by weight of alumina is removed, leaving adsorbed nitrate in the alumina by washing the leached pieces with water until the pH of the wash water therefrom is about 4.6, impregnating the pieces with platinum and halogen by contacting them with an aqueous solution of chloroplatinic acid, and then drying and calcining the pieces so treated.

5. In the production of halogen-containing platinized alumina catalysts the method of controlling the halogen content thereof which comprises leaching pieces of active alumina by contacting them with an equimolecular quantity of nitric acid sufficiently strong to react with alumina until from about 2% to about 15% by weight of alumina is removed, leaving about 0.1 equivalent of nitrate per mol of Al₂O₃ adsorbed in the alumina by washing the leached pieces with water until the pH of the wash water therefrom is about 4.6, impregnating the pieces with platinum and halogen by contacting them with an aqueous solution of chloroplatinic acid, and then drying and calcining the pieces so treated.

6. In the production of halogen-containing platinized alumina catalysts the method of controlling the halogen content thereof which comprises leaching pieces of active alumina by contacting them with an aqueous hydrochloric acid-containing solution sufficiently strong to react with alumina until from about 2% to about 15% by weight of alumina is removed, washing the leached pieces with water until the pH of the wash water therefrom is about 4.6, impregnating the pieces so obtained with an aqueous chloroplatinic acid solution containing about 0.2% to 1% of platinum on the weight of the alumina and also containing as a penetrant sufficient nitric acid to acidify the solution to a pH not higher than about 2.5–2 and drying and calcining the impregnated pellets so obtained.

References Cited in the file of this patent
UNITED STATES PATENTS

| 2,723,947 | Oblad | Nov. 15, 1955 |
| 2,769,688 | Milliken | Nov. 6, 1956 |
| 2,887,455 | Cornelius | May 19, 1959 |